US005442993A

United States Patent [19]

Baliotti, II et al.

[11] Patent Number: 5,442,993

[45] Date of Patent: Aug. 22, 1995

[54] SELF-ALIGNING PISTON

[75] Inventors: John A. Baliotti, II, New Canaan; Kenneth L. Lauck, Beacon Falls, both of Conn.

[73] Assignee: United Technologies Corporation, Hartford, Conn.

[21] Appl. No.: 180,616

[22] Filed: Jan. 13, 1994

[51] Int. Cl.[6] .................... F16J 1/00

[52] U.S. Cl. .................... 92/84; 92/187; 403/228

[58] Field of Search .................... 403/133, 228, 226, 225, 403/220; 92/84, 187, 179

[56] References Cited

U.S. PATENT DOCUMENTS

| | | | |
|---|---|---|---|
| 1,543,498 | 6/1925 | Hammond | 92/187 |
| 1,943,364 | 1/1934 | Betz | 92/187 |
| 3,053,595 | 9/1962 | Dilworth | 92/187 |
| 4,938,121 | 7/1990 | Melchior | 92/187 |

FOREIGN PATENT DOCUMENTS

| | | | |
|---|---|---|---|
| 2513386 | 10/1976 | Germany | 92/179 |
| 0129962 | 8/1982 | Japan | 92/187 |

*Primary Examiner*—Thomas E. Denion
*Attorney, Agent, or Firm*—McAulay Fisher Nissen Goldberg & Kiel

[57] ABSTRACT

A self-aligning piston assembly has a piston member having a sidewall for slidable displacement within a bore, the piston member having an inner curved surface, the piston assembly having an inner race member having means to attach to a connecting member, the inner race member having a curved surface complimentary to the inner curved surface and, an elastomer member disposed therebetween substantially in the form of a sphere to provide a spherical type mounting of the piston to the connecting member. Utilizing a spherical type mounting, axial rigidity is maintained yet any side loading which acts through the connecting member or manufacturing tolerances are absorbed through the spherical elastomer to prevent misalignment or cocking of the piston within the bore during stroking. Utilizing the invention, excessive wear and fluid leakage by the piston is avoided since misalignment is absorbed by the elastomer member.

12 Claims, 5 Drawing Sheets

SELF-ALIGNING PISTON

TECHNICAL FIELD

This invention relates to a piston assembly and more particularly to a piston having a spherical bearing type mounting to a connecting member for accommodating self alignment of the piston within a bore.

BACKGROUND

There are many different piston designs used, for example, in air compressors, combustion engines, or in hydraulic actuators, among others. For example, in a hydraulic actuator, hydraulic fluid pushes against one side of a piston located within a bore to cause translation of a rod attached thereto. Typically the rod is connected to a member which is displaced in accordance with the translation of the piston within the bore.

In FIG. 1, a conventional arrangement is shown where a piston (A) resides in a bore (B) having means for applying fluid pressure to one side of the piston which results in translation of a rod (C) attached thereto. This rod may be used for example to position the rotor blades of a helicopter aircraft for blade fold storage. Of course, such actuators have many different applications.

One problem with these and other piston arrangements is that there is a rigid connection of the piston to the rod. Such a rigid connection locks the piston to the rod such that when bending loads are applied to the rod, they are transmitted to the piston which may cock within the bore. For example, if the actuator were used on an aircraft, flexing of the associated aircraft structures may cause such cocking of the piston and thereby result in excessive wear of the bore which in turn leads to leakage of the hydraulic fluid. Also, misalignment or eccentricities do occur due to tolerance stack-ups in manufacturing and assembly. Even in assemblies where the piston is pinned to a rod, such as a connecting rod in a combustion engine, such pinned type connections allow misalignment to be absorbed only in one direction, the direction about which the connecting rod is rotatable. In all other directions, it is a rigid connection and thus side loads could cause cocking of the piston and result in excessive bore wear.

SUMMARY OF THE INVENTION

It is an object of the invention to provide a piston flexibly connected to a connecting member. It is yet another object of the present invention to provide a piston which is self-aligning in a cylinder bore.

It is a further object to provide a piston assembly which includes a self aligning piston mounted by spherical bearing means to a connecting member.

These and other objects of the present invention are achieved by a piston assembly comprising a piston having an outer race portion with a curved surface, an inner race member with a complimentary curved surface and an elastomer member located between the inner race member and the outer race portion, the elastomer member substantially in the form of a sphere.

Instead of a rigid or pinned connection, the piston is mounted to a rod with a spherical bearing type mount which allows side loads acting on the rod in virtually any direction to be absorbed by the elastomer member. The piston with the outer race portion is also free to adapt to the bore to accommodate manufacturing tolerances. Consequently, the piston is centered and sealed within the bore, preventing excessive bore wear and leakage.

FIG. *2a* is an enlarged view of the piston assembly of FIG.

Figure 3:
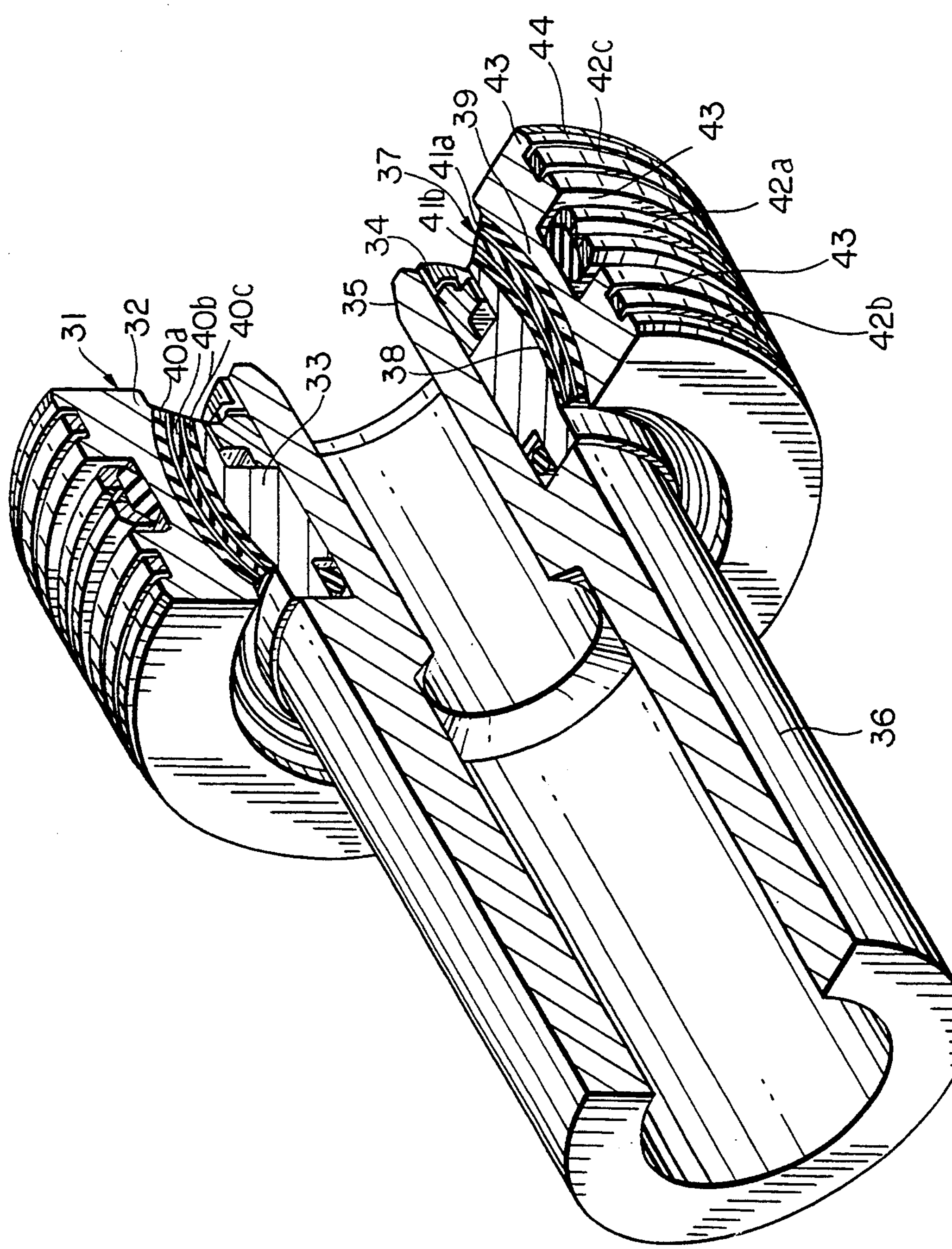

FIG. 3 is an enlarged cross sectional of an alternative embodiment of the piston assembly of the present invention.

Figure 4:
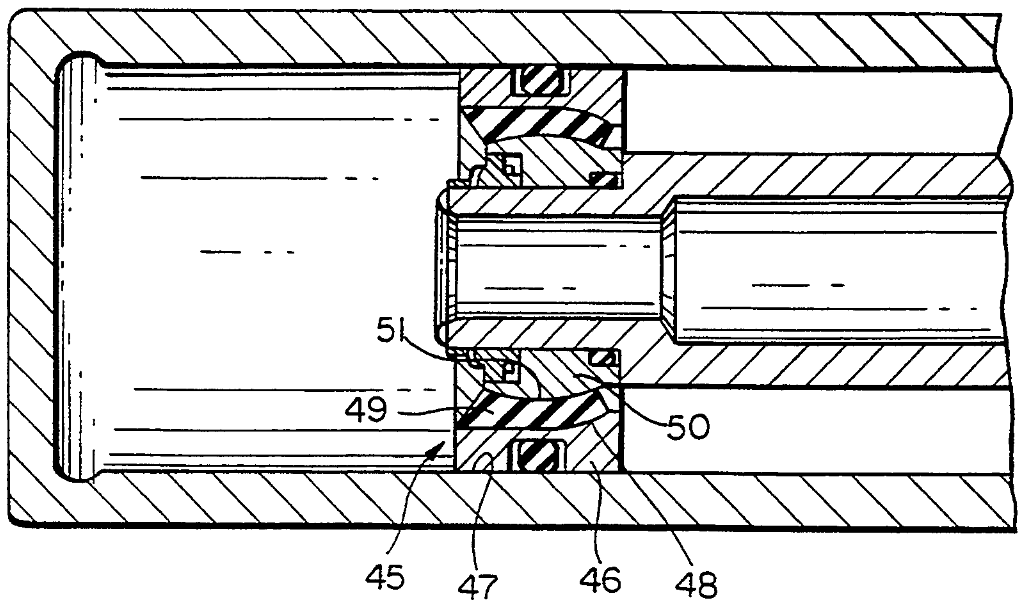

FIG. 4 is a cross sectional of another alternative embodiment of the invention.

Figure 5:
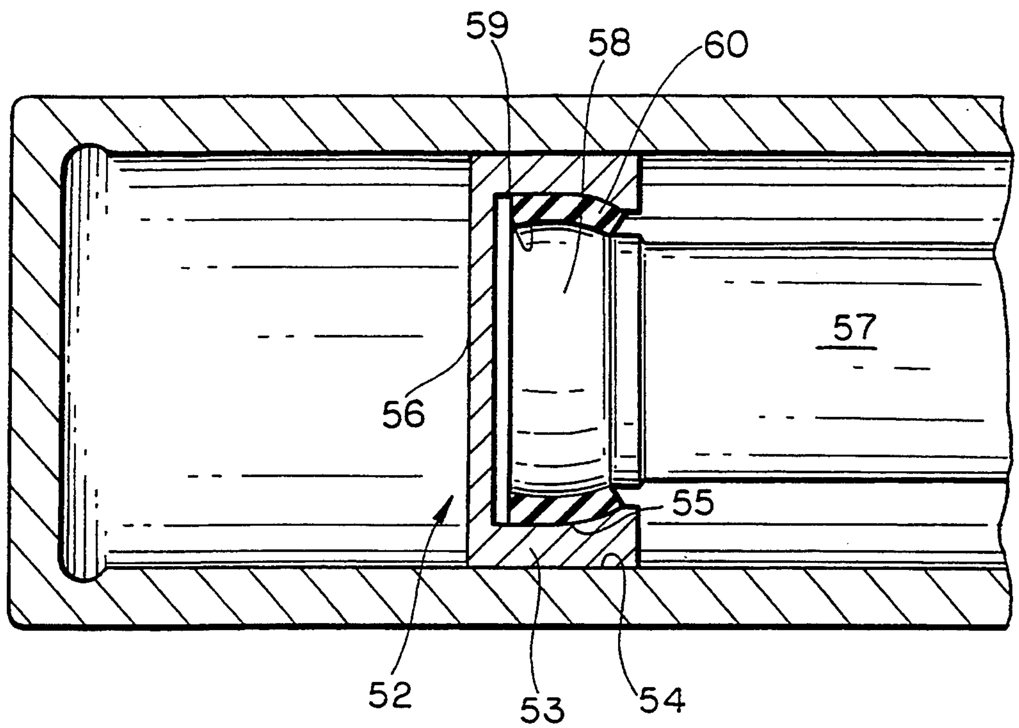

FIG. 5 is another alternative view of the piston assembly of the present invention.

Figure 6:
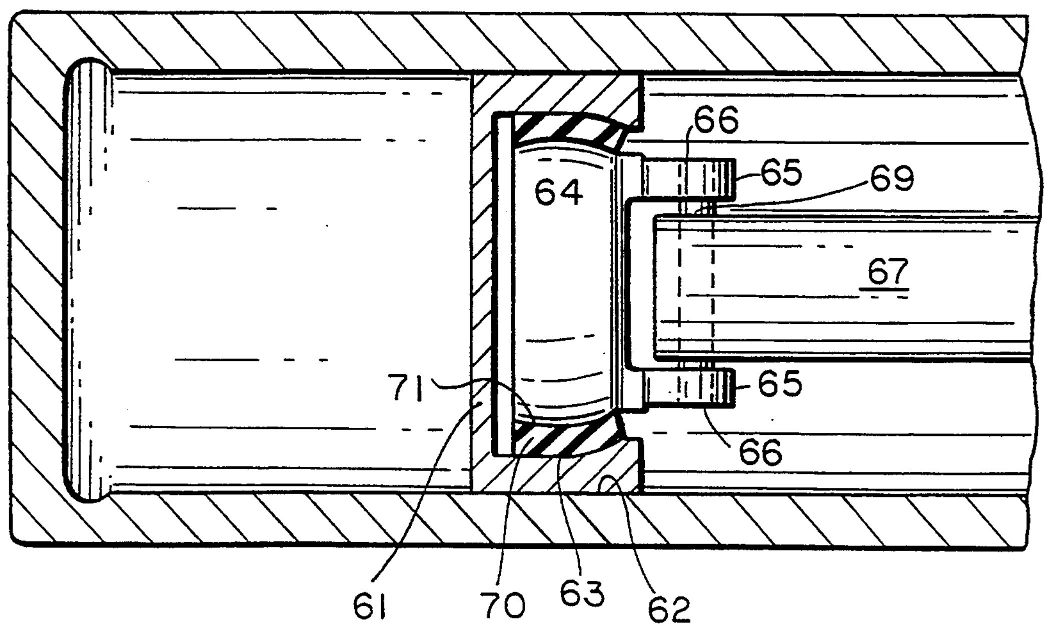

FIG. 6 is another alternative embodiment of a piston assembly incorporating the present invention.

DETAILED DESCRIPTION OF THE INVENTION

Figure 2:
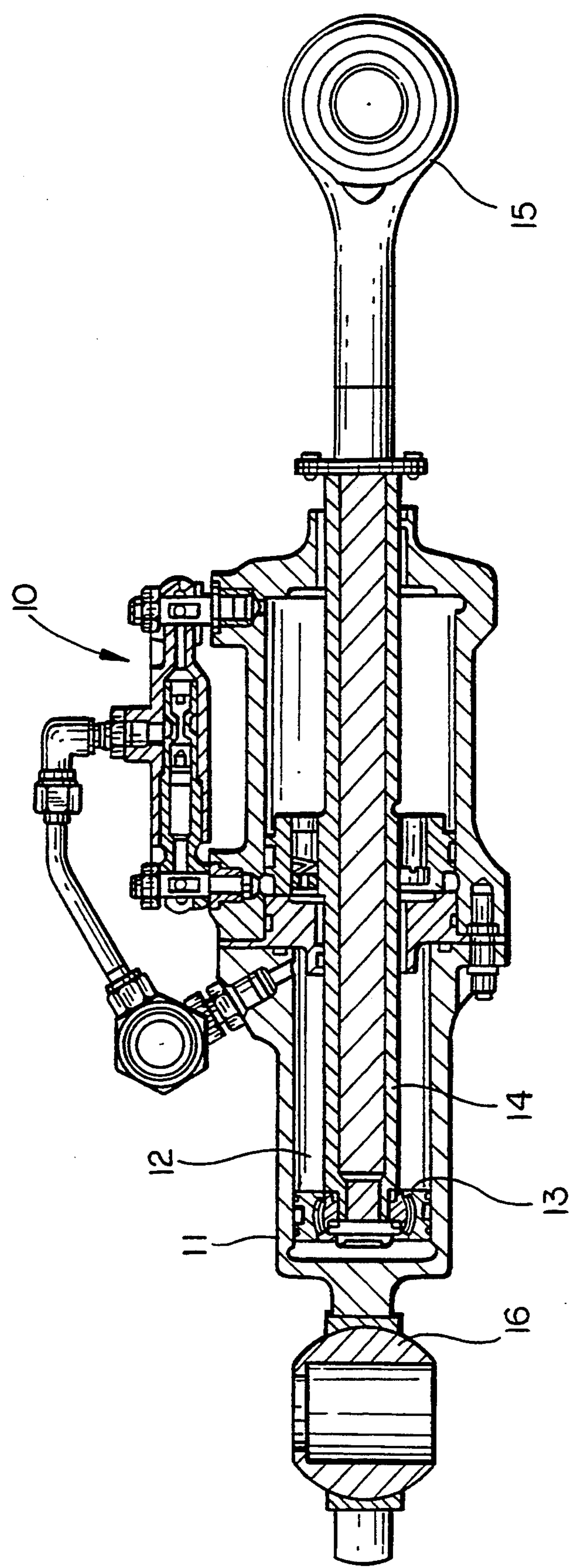
FIG. 2 is a cross sectional view of a hydraulic actuator incorporating the piston assembly of the present invention.
Figure 2A:
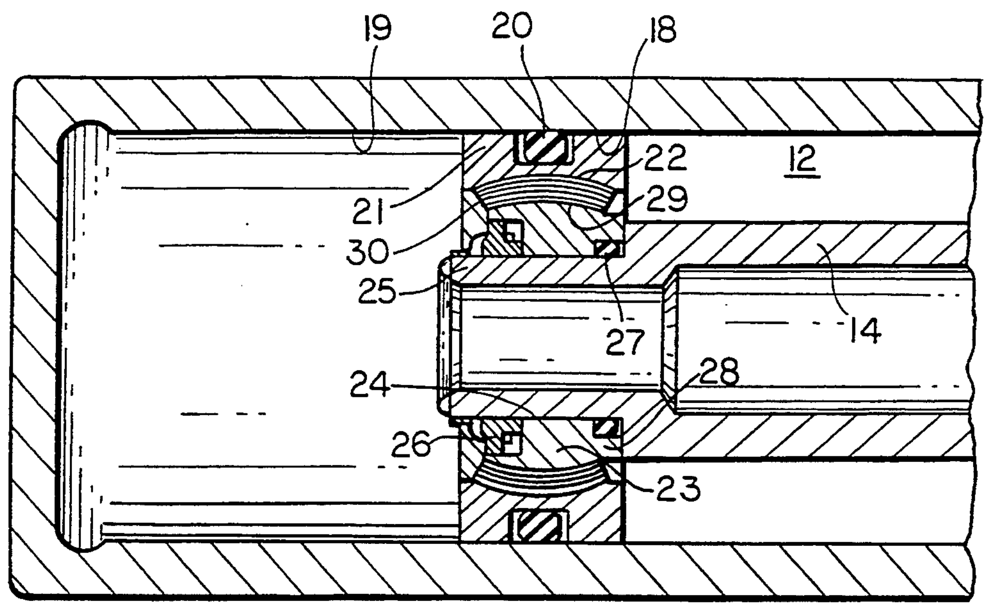

Referring to FIG. 2, a hydraulic damper 10 is shown. While a hydraulic damper is exemplary of the invention, it will be understood that any piston incorporating device could benefit from the invention. The damper includes a housing 11 which has a bore 12 within which a piston assembly 13 is reciprocally movable. The piston assembly is attached to a rod 14 which has a lug 15 at an end thereof for connection to an associated structure. Similarly, the housing 11 has a lug 16 for attachment to a corresponding structure. Translation of the piston within the bore in response to fluid pressure acting against the piston thus causes a movement of a structure connected to one of the lugs.

Referring to FIG. *2a*, an enlarged cross-sectional view of the piston assembly utilizing the present invention is shown. The piston assembly 13 has a surface 18 for slidable engagement with a wall 19 of the bore 12. A resilient seal 20 is provided in this embodiment for engagement with the wall. The piston 13 also has an inner chamber 21 which has an inner curved surface 22, to form an outer bearing race portion.

The piston assembly 13 also-includes an inner race portion 23 which has an inner bore 24, within which a stub 25 of the rod 14 is located. The inner race portion 23 has means for attachment to the stub of the rod. In this instance, the stub is threaded and a nut 26 is used to attach the inner race portion to the rod. Also, an O-ring 27 is provided in a groove 28 to prevent leakage of any fluid by the joint between the inner race portion and the rod. The inner race portion has a curved surface 29 complimentary to the curved surface 22, with a space therebetween.

Located between the pair of curved surfaces is an elastomer member 30. The inner chamber forming the outer race portion has a substantially spherical type curved surface, while the inner race has a complimentary substantially spherical curved surface to, in effect, transform the piston assembly into a spherical elastomeric bearing. The elastomer member is bonded to the complimentary curved surfaces to provide a unitary piston assembly.

The elastomer member disposed between the inner and outer races may be composed of a single unitary elastomer layer, as shown in FIG. 2 or be produced as a plurality of bonded laminated plys as shown in FIG.

2a and be composed of an elastomer such as natural or synthetic rubber, or silicon elastomer, fluoro-elastomer or blends thereof. Of course, other elastomers may be chosen to provide specific performance characteristics related to fluid compatibility, temperature pressure limitations, fatigue life, etc. This choice can be made by one skilled in the art. For example, the unitary elastomer member may be composed of a blend of natural and synthetic rubbers, about 75 to 90 percent natural rubber, and 25–10 percent synthetic rubber. Among these synthetic rubbers usable are polybutane, butanol, and butanol rubbers, among others. Additionally, silicon or fluoro-elastomers may be used.

When a layered elastomer member is used, it is also possible to place plys of different elastomer materials together and to optionally include shims between the elastomer plys. The shims are made of a non-extensible material such as metal or a generally rigid plastic composite. Typically, metal shims are utilized between the plys.

Referring to FIG. 3, an alternative embodiment of the invention is shown. In this embodiment, a piston assembly 31 has an outer race portion 32 and an inner race portion 33. A nut 34 secures the inner race portion 33 to a stub 35 of a rod 36. A laminated elastomer member 37 is located between a curved surface 38 on the inner race portion and a curved surface 39 of the outer race portion. The elastomer member has three elastomeric plys, 40*a*, b and c, separated by two non-extensible shims 41*a* and 41*b*. In this embodiment, three elements 42*a*, b and are disposed in three grooves 43 in a cylindrical sidewall 44 of the piston to assist in centering and sealing the piston assembly. The element 42*a* is a seal, and the elements 42*b* and c are guide rings which are commonly used to react to loads applied to the piston head. Also, spreading the elements across the sidewall assists in self-aligning the piston in a bore.

The quantity, location and even provision of such seals or guide rings depends on the ultimate use of the piston, and no seals or guide rings are necessary to practice the invention.

Preferably, the elastomer member and curved surfaces are shaped to act as a spherical type bearing mount. However, the degree of curvature and thickness of the elastomer can be tailored to accommodate known or anticipated loading conditions and the invention is not limited to a perfect sphere shape. The generally spherical shape is useful in piston assemblies because it limits axial distortion while providing sufficient flexibility to allow self-alignment within a bore.

In an alternative embodiment of the present invention, shown in FIG. 4, a piston assembly 45 has an outer race portion 46, with a cylindrical sidewall 47, which has an inner curved surface 48. The degree of curvature and the thickness of an elastomer member 49 are tailored, by the curved surface 48, to accommodate expected design loads. An inner race portion 50 has a curved surface 51 more closely resembling the ball shape, common to a spherical type mount. Regardless of these variations, a self-aligning piston is achieved.

Referring to FIG. 5, an alternative embodiment is shown. A piston assembly 52 has an outer race portion 53, having a cylindrical sidewall 54 and an inner curved surface 55. The outer race portion also has a piston head surface 56. A rod 57, has a forward end 58 which is shaped to have an outside curved surface 59 such that the it forms the inner race of the piston assembly. An elastomer member 60 is located between the curved surfaces. Thus, the piston head has an integral outer race and the rod has an integral inner race with the connection between the rod and piston accommodated through the generally spherical elastomer member 60 disposed and bonded therebetween.

Yet another embodiment of the present is shown in FIG. 6 where a piston head 61 has a cylindrical sidewall 62 and an inner curved surface 63. An inner race portion 64 is provided which includes a pair of lugs 65 having a pair of co-axial passages 66 therethrough. A rod 67 has a complimentary passage 68 at a forward end thereof. A pin 69 is provided for attaching the rod to the piston portion via the lugs 65.

As in the previous embodiments, an elastomer member 70 is disposed between a pair of curved surfaces 63 and 71 to form a spherical bearing type mount. Consequently, even where a pin type connection is used, the spherical bearing type mounting can provide self alignment of a piston to minimize the potential for wear and fluid leakage.

Utilizing the invention, a self aligning piston is provided which is adaptable for absorbing various forces which may act to cock the piston during its stroking within a bore. The elastomer is fairly rigid with the physical shape limiting axial distortion yet the spherical type elastomer member provides sufficient flexibility to allow the piston to align itself properly within the bore even in the face of forces tending to cause cocking and distortion. In addition, the direction of these forces is irrelevant as the spherical type mounting is effective from all directions.

Figure 1:
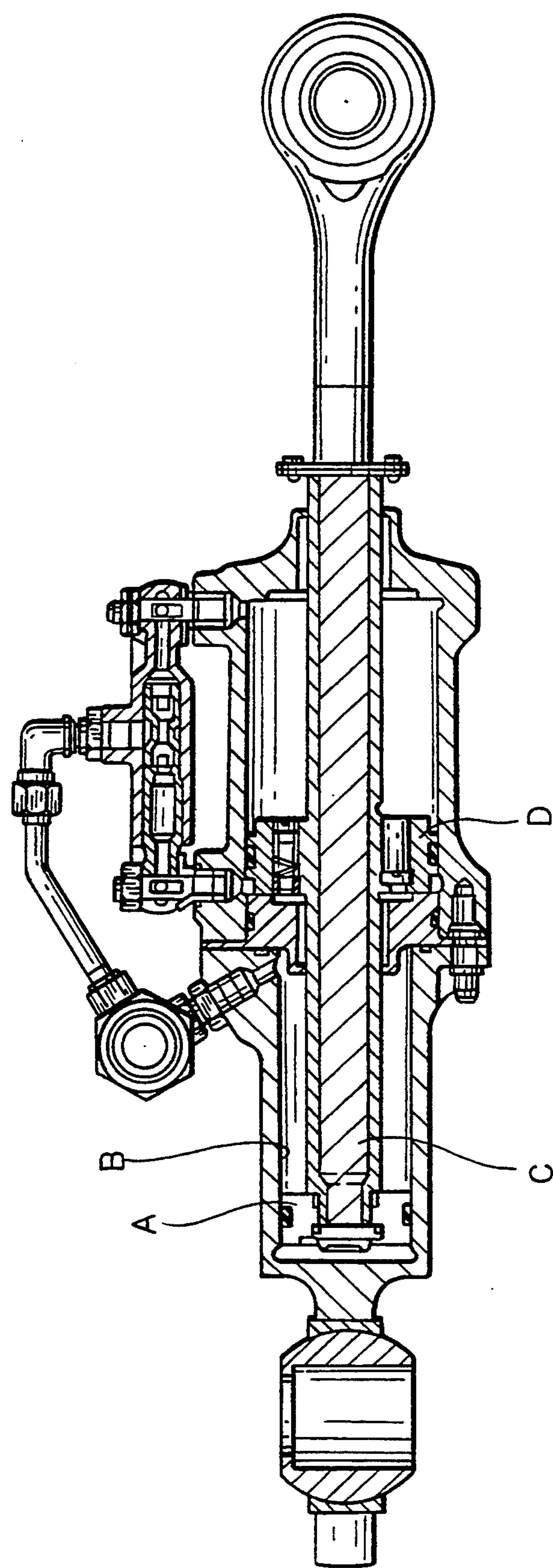
FIG. 1 is a prior art view of a hydraulic actuator.

While specific embodiments of the present invention have been shown and described, it will be understood by those skilled in the art that various changes and modifications could be made without varying from the scope of the present invention. For example, the inventive piston assembly may be disposed, rather than on an end of a connecting member, on a middle portion of the connecting member such as in mounting the piston (D) to the rod (C) in FIG. 1. Essentially, any piston could benefit from the spherical-type mounting arrangement of the present invention.

We claim:

1. A piston assembly consisting essentially of a piston member having a side wall for slidable displacement within a bore, the piston member having a single inner chamber with a curved surface;

a single inner race member having a complimentary curved surface located within the inner chamber; and an elastomer member located between the curved surfaces, the elastomer member substantially in the form of a sphere, the elastomer member composed of a plurality of elastomer plies.

2. The piston assembly of claim 1, wherein the inner race member further comprises means to attach to a connecting member.

3. The piston assembly of claim 2, wherein the inner race member has a passage, a connecting member having a threaded end for extension through the passage, and further comprising a nut for attaching the connecting member to the inner race member.

4. The piston assembly of claim 1, further comprising one or more grooves disposed about the sidewall and means for sealing or guiding the piston assembly are disposed within the one or more grooves.

5. The piston assembly of claim 1, wherein the elastomer member is a unitary elastomer construction.

6. The piston assembly of claim 1, wherein one or more non-extensible shims are disposed between adjacent plys.

7. The piston assembly of claim 1, wherein the elastomer member is composed of natural rubber, synthetic rubber, silicon, fluoroelastomer or blends thereof.

8. The piston assembly of claim 1, wherein each of the elastomer plys is formed by one or more plys constructed of natural rubber, synthetic rubber, silicon, fluoroelastomer or combinations thereof.

9. The piston assembly of claim 1, further comprising a piston head surface disposed at a forward end of the piston member.

10. The piston assembly of claim 1, wherein the inner race member is integrally constructed with a connecting member.

11. The piston assembly of claim 1, further comprising a pair of lugs extending from the inner race member, each lug having a facing passage, a connecting member with a corresponding passage locatable between the lug members, and, a pin for connecting the connecting member to the inner race member located in the connecting member passage and within the lug passages.

12. A method for providing a self-aligning piston assembly comprising:

providing a piston member having a sidewall for slidable displacement within a bore, the piston member having a single inner chamber with a curved surface, providing a single inner race member having a complimentary curved surface, to the inner chamber curved surface, and providing an elastomer member between the complimentary curved surfaces, the elastomer member substantially in the form of a sphere, the elastomer member being composed of a plurality of elastomer plies.

* * * * *